United States Patent Office 3,522,220
Patented July 28, 1970

3,522,220
SULFATED, HYDROXYLATED DIOLEFIN POLYMERS
Thomas F. Rutledge, Wilmington, Del., assignor to Atlas Chemical Industries, Inc., Wilmington, Del., a corporation of Delaware
No Drawing. Filed Jan. 31, 1968, Ser. No. 701,833
Int. Cl. C08f 27/06, 13/06; C11d 3/065
U.S. Cl. 260—79.3                    10 Claims

ABSTRACT OF THE DISCLOSURE

Sulfated, hydroxylated, unsaturated hydrocarbon polymers of conjugated diolefins are prepared by contacting conjugated diolefin with a mixture of sulfuric acid and an amide selected from the group consisting of oxamide, benzamide, sulfamide, and sulfamic acid. Typically, amide and concentrated aqueous sulfuric acid in mol proportions of 1:1.5 are suspended in an inert diluent and 0.8 to 10 molar proportions of conjugated diolefin are gradually introduced at 10 to 20° C. over a period of several hours. The recovered sulfated, hydroxylated, unsaturated polymer, in the form of its water-soluble salt, is a useful detergent component.

This invention relates to polymeric materials and to a method for preparing them. More particularly it relates to sulfated, hydroxylated, unsaturated, hydrocarbon polymers of conjugated diolefins and to a method for preparing them in high yields.

United States patent application Ser. No. 419,201, filed by Thomas F. Rutledge on Dec. 17, 1964, now Pat. No. 3,379,694 discloses that sulfated, unsaturated, nitrogen-containing polymers are obtained by contacting diolefins with urea in the presence of sulfuric acid.

It has now been discovered that certain diolefins, when brought into contact with certain amides in the presence of sulfuric acid, react in a manner not predictable from the behavior of diolefins toward urea. In accordance with the present invention, sulfated, hydroxylated, unsaturated, hydrocarbon polymers of conjugated diolefins are prepared by contacting a conjugated diolefin with an amide selected from the group consisting of oxamide, benzamide, sulfamide, and sulfamic acid in the presence of sulfuric acid. The essentially nitrogen-free polymeric products formed contain in addition to sulfate and hydroxyl groups, a plurality of residues from diolefin.

The reaction conditions under which the polymeric products of the invention are prepared are similar to those disclosed in U.S. application Ser. No. 419,201, the disclosure of which is hereby incorporated hereinto by reference, for reacting diolefins with urea in the presence of sulfuric acid; and it is quite unexpected to find that polymeric products of this invention are essentially free of nitrogen. It is further surprising to find, under the mild reaction conditions employed herein, that significant proportions of sulfuric acid are taken up in the polymer. It appears to be in the form of a sulfate half ester so that the polymers are acidic in character and can form salts.

The conjugated diolefins which have been found to undergo this unexpected polymerization reaction are acyclic 1,3-diolefins containing from 4 to 7 carbon atoms, cyclopentadiene, and 5-alkyl cyclopentadiene-1,3 having from 1 to 3 carbon atoms in the alkyl group. Compounds so defined include 1,3-butadiene, isoprene, piperylene, 2-ethyl butadiene-1,3, and 2-n-propyl-butadiene-1,3, cyclopentadiene, 5-methyl cyclopentadiene, 5-ethyl cyclopentadiene-1,3, and 5-propyl cyclopentadiene-1,3.

The amides which may be used to prepare the high yields of sulfated, hydroxylated, unsaturated, hydrocarbon polymers of conjugated diolefins in accordance with this invention are oxamide, benzamide, sulfamide, and sulfamic acid. Adipamide, succinamide, fumaramide, phthalamide, and terephthalamide are not active in the process of this invention.

In broad terms the process by which the polymers of the invention are prepared comprises the addition of at least one diolefin as above defined to a suspension of a mixture of at least one of the above amides and sulfuric acid in an inert organic diluent and recovering the formed polymer from the unreacted components and by-products such as diolefin oligomer. Unreacted components, diluent and oligomer may, if desired, be recovered and recycled to the reactor with fresh reactants for the preparation of additional polymer.

The diluent in which the polymerization is carried out must be inert to the concentrated acid and other polymerizing components. Saturated aliphatic, cycloaliphatic or aromatic hydrocarbons, and halogenated derivatives of such hydrocarbons, particularly chlorinated or fluorinated derivatives, have been found satisfactory. Typical examples of such diluents are methylene dichloride, cyclohexane, hexane, pentane, benzene, xylene and carbon tetrachloride. Separation of diluent from the formed polymer and reaction product is facilitated if the diluent is readily distillable and for this reason diluents boiling at temperatures not to exceed 100° C. at ordinary pressures are preferred. Methylene dichloride and cyclohexane have been found particularly satisfactory in the process and are the preferred diluents for carrying out the polymerization.

The polymerization proceeds satisfactorily when the concentration of sulfuric acid admixed with amide in forming the amide-sulfuric acid suspension ranges from about 85% to 105% by weight of equivalent $H_2SO_4$. Optimum results have been obtained with acid concentrations of from 92 to 98% by weight and it is preferred to employ acid in this concentration range.

Polymers in accordance with the invention are obtainable if the molar proportion of sulfuric acid to amide employed ranges upward from 0.75. At somewhat higher molar ratios, i.e. at from about 1 to 4 molar proportions of sulfuric acid per mol of amide the polymerization is more efficient and it is preferred to operate in this range. With further increase in the molar ratio of acid to amide the gain in conversion is less pronounced and ratios greater than 5 are generally undesirable. Although the polymerization occurs in the presence of excessive quantities of acid the burden in recovery of product and recycling of reactants is increased with little concomitant gain in conversion or yield.

Considerable heat is evolved on mixing the sulfuric acid and amide. Conveniently, finely ground amide is suspended in the diluent to be employed and sulfuric acid added gradually with good agitation and cooling to prevent excessive temperature rise. The resulting suspension is adjusted to the desired reaction temperature which may suitably be at any value between about −10° C. and 70° C., preferably between 10° and 45° C., and the selected diolefin introduced gradually with vigorous agitation while controlling the system in the desired temperature range. The addition is continued until from 0.8 to 10 and preferably from 3 to 6 mols of diolefin per mol of amide have been introduced, the rate of addition being adjusted so that the entire quantity is added in a period of from 0.5 to 6.0 hours.

Polymerization of the diolefin is rapid and is virtually complete as soon as all the diolefin has been added. The reaction mixture is usually stirred a short time after all the components have been added to insure formation of as much polymer as possible.

The reaction mixture at this stage contains the sought sulfated, hydroxylated, diolefin polymer; amide, water, sulfuric acid, and diolefin; and diolefin oligomer. The amide is insoluble in the reaction mixture and may be removed by filtration. Water-soluble components are removed by dilution of the reaction mixture with water and decanting the aqueous phase. From this phase sulfuric acid and water-soluble polymer may readily be recovered for recycling to succeeding preparations of the polymer.

From the remainder of the reaction mixture, comprising a diluent solution of unreacted diolefin, diolefin oligomer, and diluent-soluble polymer, the polymer may be recovere either as the sulfuric acid half ester or in the form of a salt thereof. The particular steps of the recovery process will vary, depending on whether the half ester or salt form is desired, on which diolefin was polymerized, and on the diluent employed in the polymerization step.

In order that those skilled in the art may better understand how the present invention may be practiced, the following examples are given. These examples are set forth solely for the purpose of illustration and any specific enumeration of details contained therein should not be interpreted as expressing limitations of this invention. All parts and percentages are by weight, unless otherwise stated.

EXAMPLE 1

(A) Formation of polymer

To a vigorously agitated suspension of 22 grams oxamide (0.25 mol), ground to a fine powder, in 210 ml. methylene dichloride there was added 53.2 ml. 96% sulfuric acid (1.0 mol) over a period of 15 minutes and at a temperature of 20° C. Cooling was discontinued and the slurry stirred for about 45 minutes. The temperature was lowered to 15° C. and butadiene bubbled into the agitated oxamide-acid slurry at a rate of 11.2 standard liters per hour for three hours (1.5 mols). The butadiene flow was stopped and the mass agitated an additional hour to consume all possible dissolved butadiene.

(B) Recovery of polymer

While maintaining the temperature of the reaction product at 15° C., 100 ml. water was added and the mixture filtered. The solid residue was washed with methylene dichloride and methyl alcohol and the washings added to the filtrate. The residue was then washed with aqueous sodium bicarbonate solution and dried. The dried residue was oxamide and weighed 22 grams. The liquid layers of the filtrate were allowed to separate and the aqueous phase discarded. The organic layer was neutralized by adding powdered sodium bicarbonate and then filtered. The filtrate was then distilled to remove all solvent. The dried product was a crisp, orange-brown solid weighing 70 grams. Its analysis was as follows: N=0.26%, S=4.93%, Sulfated ash=19.0%, Hydroxyl No.=90, Iodine No.=150, and Acid No.=12. By calculation based on the above analysis the polymer contained, per sulfate group, 39 units from butadiene, 4.2 hydroxyl groups, 15.8 double bonds and 1 sodium.

EXAMPLE 2

A butadiene polymer was prepared and recovered following the same procedure of Example 1 with the variations indicated below:

Amide—0.25 mol of sulfamide
Sulfuric acid—0.375 mol of 96% strength
Butadiene—0.75 mol The recovered polymer weighed 48 grams and had the following analysis: N=2.74%, S=12.2%, Sulfated ash=35%, Hydroxyl No.=93, and Iodine No.=90.

EXAMPLE 3

A butadiene polymer was prepared and recovered following the procedure described in Example 2 with the single exception that 0.25 mol of sulfamic acid was employed in place of the sulfamide. The recovered polymer weighed 18.6 grams and had the following analysis: N=0.74%, S=6.29%, Sulfated ash=17.36%, Hydroxyl No.=16, and Iodine No.=116.

EXAMPLE 4

(A) Formation of polymer 26.6 ml. of 96% strength sulfuric acid (0.5 mol) was added to a suspension of 22 grams of oxamide (0.25 mol) in 210 ml. of methylene dichloride over a period of 15 minutes and at a temperature of 20° C. Cooling was discontinued and the slurry stirred for 45 minutes. The temperature was lowered to 20° C., and isoprene (0.75 mol) added to the stired oxamide-sulfuric acid slurry over a three hour period. The mass was agitated an additional hour to consume all possible dissolved isoprene.

(B) Recovery of polymer

While maintaining the temperature of the reaction product at 20° C., 100 ml. of water was added and the mixture filtered. The solid residue was washed with methylene dichloride and methyl alcohol and the washings added to the filtrate. The residue was then washed with aqueous sodium bicarbonate solution and dried. The dried residue was oxamide. The liquid layers of the filtrate was allowed to separate and the aqueous phase discarded. The organic layer was distilled to remove all solvent and the residue dried to yield 54.5 grams of a hydroxylated, sulfated isoprene polymer in the acid form. Its analysis was as follows: N=0.06%, S=1.34%, Sulfated ash=2.8%, Hydroxyl No.=18, Iodine No.=163, and Acid No.=7.3. By calculation based on the above analysis the polymer contained, per sulfate group, 55 units from isoprene, 1.3 hydroxyl groups, and 25 double bonds.

EXAMPLE 5

A piperylene polymer was prepared and recovered following the procedure described in Example 4 with the single exception that piperylene was employed in place of the isoprene. The recovered polymer weighed 53.2 grams and had the following analysis: N=0.02%, S=3.47%, Hydroxyl No.=66, Iodine No.=162, and Acid No.=31. By calculation based on the above analysis the polymer contained, per sulfate group, 21 units from piperylene, 1.8 hydroxyl groups, and 12 double bonds.

EXAMPLE 6

A butadiene polymer was prepared and recovered following the same procedure of Example 1 with the variations indicated below:

Sulfuric acid—0.625 mol of 96% strength
Diolefin—Butadiene added at a rate of 7.48 standard liters per hour for 2.5 hours (0.835 mol)
Temperature during addition of butadiene—25° C.

The recovered polymer weighed 34.7 grams and had the following analysis: N=1.72%, S=5.06%, Sulfated ash =9.73%, Hydroxyl No.=159, Iodine No.=129, and Acid No.=14.3. By calculation based on the above analysis the polymer contained, per sulfate group, 11.7 units from butadiene, 2.4 hydroxyl groups, 4.3 double bonds and 0.87 sodium atoms.

EXAMPLE 7

A butadiene polymer was prepared and recovered following the same procedure of Example 1 with the variations indicated below:

Sulfuric acid—0.25 mol of 99% strength
Diolefin—Butadiene added at a rate of 5.6 standard liters per hour for 3 hours (0.75 mol)

The recovered polymer weighed 29 grams and had the following analysis: N=0.02%, S=5.12%, Hydroxyl No. =42, Iodine No.=149, Sulfated ash=14.6%, and Acid No.=0.55. By calculation based on the above analysis the polymer contained, per sulfate group, 13 units from butadiene, 5.3 double bonds, 0.66 hydroxyl group, and 1 sodium atom.

EXAMPLE 8

A polymer was prepared and recovered following the procedure of Example 1 except that 0.75 mol of 85% strength sulfuric acid was used and the butadiene was added at a rate of 7.46 standard liters per hour for 3 hours (1 mol). The recovered polymer weighed 48 grams and had the following analysis: N=0.28%, S=6.83%, Hydroxyl No.=74, Iodine No.=114, Sulfated ash=21, and Acid No.=1.6. By calculation based on the above analysis the polymer contained, per sulfate group, 12 butadiene units, 1.2 hydroxyl groups, 4 double bonds, and 1 sodium atom.

EXAMPLE 9

To a stirred suspension of 0.4 mol of benzamide in 210 ml. of methylene dichloride there was added 31.92 ml. of 96% strength sulfuric acid (0.6 mol) over a period of 15 minutes and at a temperature of 20° C. Cooling was discontinued and the slurry stirred for about 45 minutes. The temperature was lowered to 15° C. and butadiene bubbled into the agitated benzamide-sulfuric acid slurry at a rate of 5.6 standard liters per hour for 3 hours (0.75 mol). The butadiene flow was stopped and mass stirred an additional hour to consume any dissolved butadiene. The weight of polymer formed was 30 grams.

EXAMPLE 10

A cyclopentadiene polymer is prepared and recovered following the same procedure of Example 1 with the variations indicated below:

Sulfuric acid—0.50 mol of 90% strength
Diolefin—Cyclopentadiene (0.75 mol) added over a period of three hours.
Diluent—200 ml. of cyclohexane The recovered polymer is a sulfated, hydroxylated, unsaturated polymer of cyclopentadiene.

The foregoing examples illustrate batch-wise preparation of polymers in accordance with the invention. The polymerization reaction is rapid and obviously the process can be adapted to continuous operation. A stream of premixed slurry of amide and sulfuric acid in diluent, which may also contain amide, oligomer and/or sulfuric acid from a previous run is continuously metered into one end of a reactor together with a proportioned stream of diolefin which may, if desired, be introduced at a plurality of points in the system. After a short residence time, reaction mixture is continuously passed from the other end of the reactor to a separation chamber into which diluting water is metered. From this chamber the organic and aqueous phases are separately withdrawn. From the organic phase the resinous copolymer is recoverable by one of the processes detailed in the foregoing illustrative examples, the separated diluent and any unreacted diolefin being recycled to the process. From the aqueous phase sulfuric acid and oligomer may, if desired, be recovered and recycled. In such recovery at least sufficient amide is added to furnish an excess of amide over sulfuric acid and the solution concentrated under reduced pressure. The concentrate is adjusted to the desired amide-sulfuric acid-water ratio for return to the reactor run by addition of the separate components as required.

The chemical structure of the polymers has not been fully elucidated. Examination by infra red spectroscopy shows the presence of organically combined radicals from an oxy acid of sulfur. That the radicals are sulfate rather than sulfonate is indicated by the fact that the polymers, on fusion with KOH yield $K_2SO_4$ rather than $K_2SO_3$. Analysis of the infra red curves also show that $C=CH_2$, $C=C$, and —OH groups are present in all the polymers. The existence of carbon double bonds in the polymers is evidenced by the fact that they all exhibit substantial iodine numbers. From the infra red curves it is seen that internal, rather than terminal, double bonds predominate. No interfering —NH groups were detected by infra red analysis.

The water-soluble salts of the diolefin polymers of the invention are surface active in character and have utility as wetting, penetrating and emulsifying agents, and as detergents. They are non-toxic and non-irritating to the skin and, in detergent formulations, yield low sudsing compositions. Of these water-soluble salts, the alkali metal (e.g. sodium and potassium) and ammonium salts are preferred though other salts, such as amine and alkanolamine, can be used if desired. The salts are formed by neutralizing the acidic form of the polymer with the appropriate base, such as sodium bicarbonate, potassium hydroxide or amine.

Built detergents containing 15% polymer, 35% sodium tripolyphosphate, 10% sodium metasilicate, 39% sodium carbonate, and 1% sodium carboxymethylcellulose were tested. Standard soiled cloth (4 squares per test) was washed for 15 minutes in a Baker Terg-O-Tometer at 125° F., and 60 r.p.m. Cloth was rinsed twice for three minutes, and dried. Built detergent was 0.25 wt. percent (2.5 g./liter), and ASTM water hardness was 200 p.p.m. Sodium dodecylbenzenesulfonate built detergent was standard, and increase in reflectance obtained with the standard was taken as 100. Other increases are expressed as numbers relative to this value. The results are shown in the following table:

TABLE I

| Detergent: | Increase in reflectance |
|---|---|
| Polymer of Example 6 | 102 |
| Polymer of Example 9 | 100 |
| Polymer of Example 10 | 104 |

Although this invention has been described with reference to particular embodiments and examples, it will be apparent to those skilled in the art that variations and modifications thereof can be made without departing from the principles and true spirit of the invention.

Having described the invention, what is desired to be secured by Letters Patent is:

1. A process for preparing a resinous product which comprises (1) preparing a suspension of an amide selected from the group consisting of oxamide, benzamide, sulfamide, and sulfamic acid and from 0.75 to 5 molar proportions of a sulfuric acid solution containing from 85 to 105 percent by weight of equivalent $H_2SO_4$ in an inert organic diluent; (2) introducing into the said suspension, at a temperature of from −10° C. to 70° C., from 0.8 to 10 molar proportions of conjugated diolefin selected from the group consisting of acyclic diolefins containing from 4 to 7 carbon atoms and being branched at no more than one carbon atom, cyclopentadiene, and 5-alkyl cyclopentadiene-1,3 having from 1 to 3 carbon atoms in the alkyl group; and (3) recovering the resinous product, all of said molar proportions being per molar proportion of amide.

2. A resinous product prepared by the process of claim 1.

3. The process of claim 1 wherein the conjugated diolefin is butadiene-1,3, isoprene, or piperylene.

4. A resinous product prepared by the process of claim 3.

5. The process of claim 1 wherein the molar proportion of sulfuric acid is from 1 to 4, the sulfuric acid solution contains from 92 to 98 percent by weight of equivalent $H_2SO_4$, the temperature is from 10° C.–45° C., and the molar proportion of conjugated diolefin is from 3 to 6.

6. The product prepared by the process of claim 5.

7. The process of claim 5 wherein the conjugated diolefin is butadiene-1,3, isoprene, or piperylene.

8. The product prepared by the process of claim 7.

9. The process of claim 5 wherein the resinous product is recovered by diluting the reaction mixture with water, neutralizing the organic phase with a base, and separating the resinous product as the water-soluble salt of a sulfuric acid half ester.

10. The product prepared by the process of claim 9.

References Cited

UNITED STATES PATENTS

| | | | |
|---|---|---|---|
| 3,047,556 | 7/1962 | Szita | 260—91.3 |
| 3,275,575 | 9/1966 | Fogle | 260—2.2 |
| 3,379,694 | 4/1968 | Rutledge | 260—77.5 |

JOSEPH L. SCHOFER, Primary Examiner

C. A. HENDERSON, JR., Assistant Examiner

U.S. Cl. X.R.

252—138, 161, 353; 260—33.6, 33.8, 82.1, 94.7